(12) United States Patent
Mao

(10) Patent No.: US 10,791,326 B2
(45) Date of Patent: Sep. 29, 2020

(54) VIDEO CODING PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/366,183

(22) Filed: Mar. 27, 2019

(65) Prior Publication Data
US 2019/0222838 A1 Jul. 18, 2019

Related U.S. Application Data

(63) Continuation of application No. PCT/CN2018/084563, filed on Apr. 26, 2018.

(30) Foreign Application Priority Data

May 3, 2017 (CN) .......................... 2017 1 0305306

(51) Int. Cl.
*H04N 19/107* (2014.01)
*H04N 19/176* (2014.01)
(Continued)

(52) U.S. Cl.
CPC ........... *H04N 19/107* (2014.11); *G06F 17/18* (2013.01); *H04N 19/147* (2014.11); *H04N 19/176* (2014.11)

(58) Field of Classification Search
None
See application file for complete search history.

(56) References Cited

U.S. PATENT DOCUMENTS 10,148,954 B2 * 12/2018 Muthu ................ H04N 19/176
2007/0086523 A1 * 4/2007 Yan ...................... H04N 19/136
375/240.13

(Continued)

FOREIGN PATENT DOCUMENTS

CN 101448159 A 6/2009
CN 101562750 A * 10/2009 ........... H04N 19/176
(Continued)

OTHER PUBLICATIONS

The State Intellectual Property Office of the People's Republic of China (SIPO) Office Action 1 for 201710305306.1 dated Apr. 28, 2019 14 Pages (including translation).

(Continued)

*Primary Examiner* — Reza Aghevli
(74) *Attorney, Agent, or Firm* — Anova Law Group, PLLC

(57) ABSTRACT

Embodiments of this application provide a video coding processing method and apparatus and a storage medium. The method includes: identifying a to-be-coded macroblock in a to-be-coded video frame; obtaining an inter-frame coding cost of the to-be-coded macroblock based on at least one inter-frame coding scheme; obtaining an intra-frame coding cost of the to-be-coded macroblock based on at least one intra-frame coding scheme; comparing the inter-frame coding cost with the intra-frame coding cost, to obtain a comparison result; determining a coding scheme of the to-be-coded macroblock based on the comparison result, the coding scheme including intra-frame predictive coding and inter-frame predictive coding; and coding the to-be-coded macroblock according to the coding scheme.

18 Claims, 5 Drawing Sheets

(51) Int. Cl.
*H04N 19/147* (2014.01)
*G06F 17/18* (2006.01)

(56) References Cited

U.S. PATENT DOCUMENTS

| | | | | |
|---|---|---|---|---|
| 2007/0263720 | A1* | 11/2007 | He | H04N 19/124 |
| | | | | 375/240.03 |
| 2008/0159397 | A1* | 7/2008 | Kawashima | H04N 19/61 |
| | | | | 375/240.16 |
| 2008/0253457 | A1* | 10/2008 | Moore | H04N 19/147 |
| | | | | 375/240.16 |
| 2009/0003454 | A1* | 1/2009 | Richardson | H04N 19/147 |
| | | | | 375/240.24 |
| 2011/0110420 | A1* | 5/2011 | Liang | H04N 19/523 |
| | | | | 375/240.03 |
| 2011/0122942 | A1* | 5/2011 | Kudana | H04N 19/14 |
| | | | | 375/240.03 |
| 2011/0292997 | A1* | 12/2011 | An | H04N 19/137 |
| | | | | 375/240.03 |
| 2012/0195377 | A1* | 8/2012 | Auyeung | H04N 19/122 |
| | | | | 375/240.12 |
| 2013/0016783 | A1 | 1/2013 | Kim et al. | |
| 2013/0294517 | A1* | 11/2013 | Fujibayashi | H04N 19/105 |
| | | | | 375/240.16 |
| 2014/0056353 | A1* | 2/2014 | Yu | H04N 19/147 |
| | | | | 375/240.15 |
| 2014/0119431 | A1* | 5/2014 | Chihara | H04N 19/139 |
| | | | | 375/240.02 |
| 2015/0003523 | A1 | 1/2015 | Valin et al. | |
| 2015/0245050 | A1* | 8/2015 | Tourapis | H04N 9/641 |
| | | | | 375/240.02 |
| 2017/0094283 | A1* | 3/2017 | Zhang | H04N 19/147 |
| 2017/0094284 | A1* | 3/2017 | Chou | H04N 19/147 |
| 2017/0094293 | A1* | 3/2017 | Chou | H04N 19/157 |
| 2017/0094304 | A1* | 3/2017 | Chou | H04N 19/52 |
| 2017/0094311 | A1* | 3/2017 | Chou | H04N 19/186 |
| 2017/0105003 | A1* | 4/2017 | Lainema | H04N 19/44 |
| 2017/0347120 | A1* | 11/2017 | Chou | H04N 19/147 |

FOREIGN PATENT DOCUMENTS

| | | | | |
|---|---|---|---|---|
| CN | 101562750 | A | | 10/2009 |
| CN | 101640802 | A * | 2/2010 | H04N 19/109 |
| CN | 101883275 | A | | 11/2010 |
| CN | 101562750 | B * | 2/2011 | H04N 19/176 |
| CN | 102438146 | A * | 5/2012 | H04N 19/159 |
| CN | 101640802 | B * | 6/2012 | H04N 19/109 |
| CN | 102438146 | B * | 4/2014 | H04N 19/51 |
| CN | 104902271 | A | | 9/2015 |
| CN | 105338365 | A * | 2/2016 | H04N 19/61 |
| CN | 105933717 | A | | 9/2016 |
| CN | 106028047 | A | | 10/2016 |
| JP | 2007524279 | A | | 8/2007 |
| JP | 2007243337 | A | | 9/2007 |
| KR | 20080035390 | A | | 4/2008 |

OTHER PUBLICATIONS

The State Intellectual Property Office of the People's Republic of China (SIPO) Office Action 1 for 201710305306.1 dated Jun. 28, 2019 11 Pages (including translation).
The World Intellectual Property Organization (WIPO) International Search Report for PCT/CN2018/084563 dated Jul. 16, 2018 5 Pages (including translation).
The Japan Patent Office (JPO) Notification of Reasons for Refusal for Application No. 2019-524914 and Translation dated May 26, 2020 16 pages (including translation).

* cited by examiner

VIDEO CODING PROCESSING METHOD AND APPARATUS, AND STORAGE MEDIUM

RELATED APPLICATIONS

This application claims priority to PCT Application No. PCT/CN2018/084563, filed on Apr. 26, 2018, which in turn claims priority to Chinese Patent Application No. 201710305306.1, entitled "VIDEO CODING PROCESSING METHOD AND APPARATUS, AND ELECTRONIC DEVICE" filed on May 3, 2017. The two applications are incorporated by reference in their entirety.

FIELD OF TECHNOLOGY

This application relates to the field of video coding technologies, and more specifically, to a video coding processing method and apparatus and a storage medium.

BACKGROUND OF THE DISCLOSURE

As the volume of video data increase, video compression technologies have become the key to optimizing transmission and storage of the video data.

The video compression technologies (for example, video compression technologies such as the H.26x series) are mainly used for eliminating redundancy in a video signal to compress a video, and a predictive coding technology is often used. In a predictive coding process, each frame of video needs to be divided into a plurality of macroblocks (MBs), and then predictive coding is performed on each macroblock. Coding schemes involved in the predictive coding are mainly classified into intra-frame predictive coding and inter-frame predictive coding.

SUMMARY

An embodiment of this application provides a video coding processing method, applied to an electronic device. The method includes identifying a to-be-coded macroblock in a to-be-coded video frame and obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame.

The method further includes obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame; comparing the inter-frame coding cost with the intra-frame coding cost, to obtain a comparison result; determining a coding scheme of the to-be-coded macroblock based on the comparison result, the coding scheme including intra-frame predictive coding and inter-frame predictive coding; and coding the to-be-coded macroblock according to the coding scheme.

An embodiment of this application provides a video coding processing apparatus, including a processor and a memory connected to the processor, the memory storing machine-readable instructions executable to the processor, and the processor executing the machine-readable instructions to perform the following operations: identifying a to-be-coded macroblock in a to-be-coded video frame; and obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame. The operations further include obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame; comparing the inter-frame coding cost with the intra-frame coding cost, to obtain a comparison result; determining a coding scheme of the to-be-coded macroblock based on the comparison result, the coding scheme including intra-frame predictive coding and inter-frame predictive coding; and coding the to-be-coded macroblock according to the coding scheme.

An embodiment of this application provides a non-volatile computer-readable storage medium, the storage medium storing machine-readable instructions, and the machine-readable instructions being capable of being executed by a processor to perform the following operations: identifying a to-be-coded macroblock in a to-be-coded video frame; obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame. The operations further include obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame; comparing the inter-frame coding cost with the intra-frame coding cost, to obtain a comparison result; determining a coding scheme of the to-be-coded macroblock based on the comparison result, the coding scheme including intra-frame predictive coding and inter-frame predictive coding; and coding the to-be-coded macroblock according to the coding scheme.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and a person of ordinary skill in the art may still derive other drawings from these accompanying drawings without creative efforts.

DESCRIPTION OF EMBODIMENTS

Figure 1A:
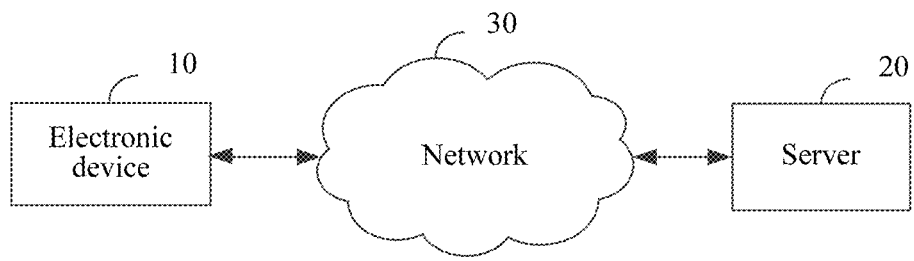
FIG. 1A is a schematic diagram of an implementation environment of a video coding processing method according to an embodiment of this application.

The following clearly and completely describes the technical solutions in the embodiments of this application with reference to the accompanying drawings in the embodiments of this application. Apparently, the described embodiments are some embodiments of this application rather than all of the embodiments. All other embodiments obtained by a person of ordinary skill in the art based on the embodiments of the present application without creative efforts shall fall within the protection scope of the present application.

In predictive coding technology, a next signal is predicted based on one or more previous signals according to a feature that discrete signals are associated, and then a difference (a prediction error) between an actual value and a predictor is coded. Currently, intra-frame predictive coding and inter-frame predictive coding need to be performed in a process of performing predictive coding on a to-be-coded macroblock. In the intra-frame predictive coding, prediction is performed based on a pixel value in a same frame, and then a prediction error is quantized and coded. In the inter-frame predictive coding, prediction is performed based on a pixel value in a neighboring frame, and then a prediction error is quantized and coded.

In the inter-frame predictive coding, a method for segmenting or sub-segmenting macroblocks of different sizes may be used, and a plurality of inter-frame coding schemes for different macroblock sizes is supported. For example, each macroblock may be segmented in 16×16, 16×8, 8×16, or 8×8. If an 8×8 macroblock is selected, a sub-macroblock may be sub-segmented in 8×4, 4×8, or 4×4 macroblocks having different segmentation manners correspond to different inter-frame coding schemes. In a process of performing the inter-frame predictive coding, a coding cost of each inter-frame coding scheme needs to be calculated. A higher coding cost indicates a higher bit rate (a quantity of data bits transmitted per unit time during data transmission) required for achieving same video quality.

In the intra-frame predictive coding, a method for segmenting or sub-segmenting macroblocks of different sizes may also be used, and a plurality of intra-frame coding schemes for different macroblock sizes is supported. Each segmentation manner corresponds to one or more intra-frame coding schemes. In a process of performing the intra-frame predictive coding, a coding cost of each intra-frame coding scheme needs to be calculated.

Finally, a coding scheme corresponding to a lowest coding cost is determined in the coding cost corresponding to each inter-frame coding scheme and the coding cost corresponding to each intra-frame coding scheme, and the coding scheme is determined as an optimal coding scheme of the macroblock.

In conclusion, during video compression, each inter-frame coding scheme and each intra-frame coding scheme need to be calculated, increasing a processing amount in a coding process. How to decrease the processing amount in the coding process has become a problem needing to be resolved by a person skilled in the art.

According to a video coding processing method provided in the embodiments of this application, an inter-frame coding cost and an intra-frame coding cost may be obtained in a manner whose processing amount is less than or even much less than that in the inter-frame predictive coding and the intra-frame predictive coding. Then, a coding scheme, that is, the intra-frame predictive coding or the inter-frame predictive coding, of a to-be-coded macroblock is determined based on a comparison result between the inter-frame coding cost and the intra-frame coding cost, so that the to-be-coded macroblock can be coded only through the intra-frame predictive coding or the inter-frame predictive coding in a coding process, to decrease the processing amount in the coding process, and improve a processing speed and processing performance.

The video coding processing method provided in the embodiments of this application may be applied to an application scenario in which a video compression technology needs to be used, for example, an application scenario in which terminals perform video chat (specifically, for example, performing video chat based on communications software such as WeChat or QQ), or an application scenario in which a terminal or a server needs to store massive videos (for example, surveillance videos). A video compression speed can be greatly improved based on the video coding processing method provided in the embodiments of this application.

FIG. 1A is a schematic diagram of an implementation environment of a video coding processing method according to an embodiment of this application. A video coding processing apparatus provided in any embodiment of this application is integrated in an electronic device 10, and the electronic device 10 is configured to implement the video coding processing method provided in any embodiment of this application. The electronic device 10 is connected to a server 20 through a network 30. The network 30 may be a wired the network, or may be a wireless network.

The video coding processing method provided in the embodiments of this application is described in detail below.

Figure 1B:
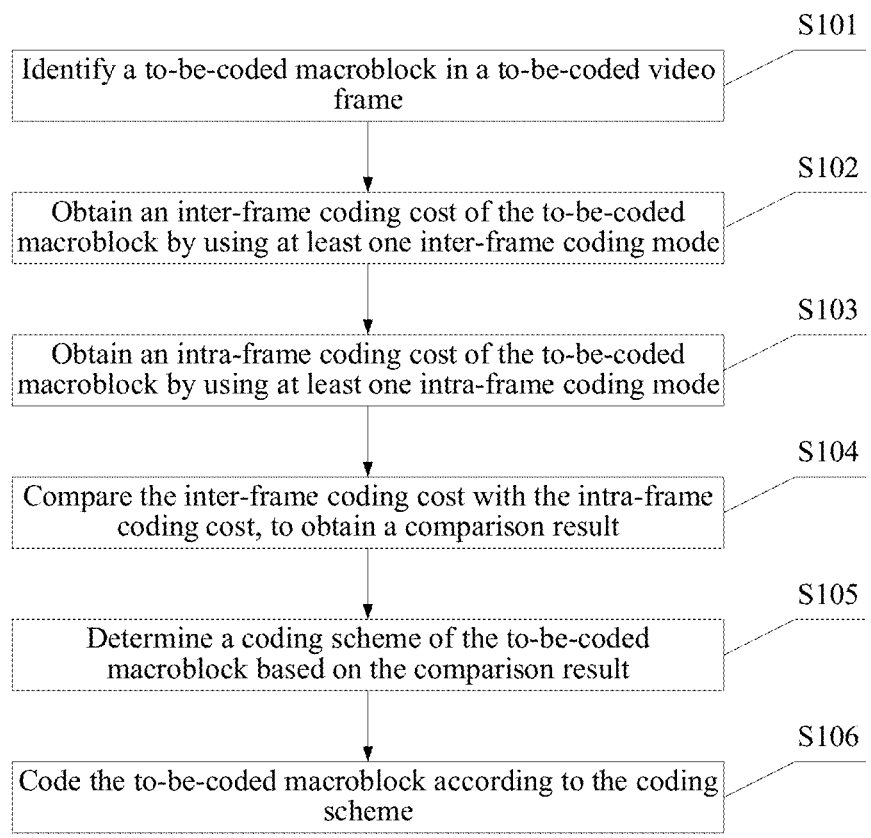
FIG. 1B is a flowchart of a video coding processing method according to an embodiment of this application.

FIG. 1B is a flowchart of a video coding processing method according to an embodiment of this application. The method is applied to the foregoing electronic device. The method includes the following steps:

Step S101: Identify a to-be-coded macroblock in a to-be-coded video frame.

Figure 2:
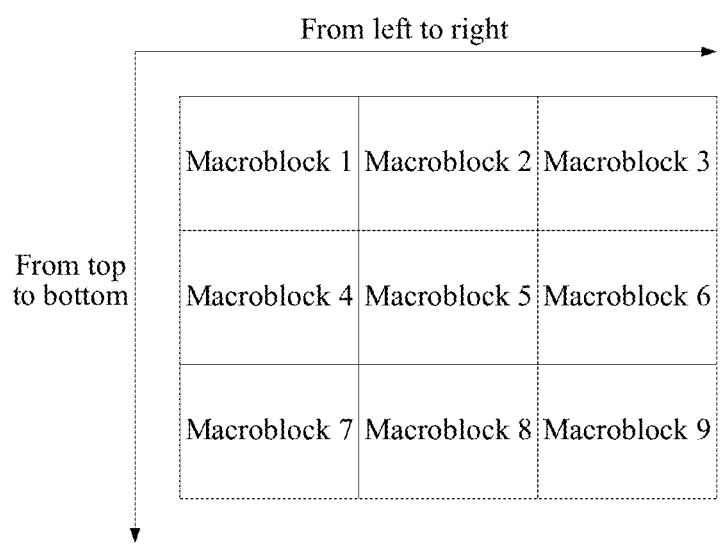
FIG. 2 is a schematic diagram of a to-be-coded video frame according to an embodiment of this application.

FIG. 2 is a schematic diagram of a to-be-coded video frame according to an embodiment of this application.

As shown in FIG. 2, it is assumed that the to-be-coded video frame is divided into nine macroblocks that are respectively a macroblock 1, a macroblock 2, a macroblock 3, a macroblock 4, a macroblock 5, a macroblock 6, a macroblock 7, a macroblock 8, and a macroblock 9.

In this embodiment of the present application, a manner of traversing the to-be-coded video frame is sequentially identifying the macroblocks in the to-be-coded video frame as the to-be-coded macroblock in top-to-bottom and left-to-right directions. Assuming that the macroblock 1, the macroblock 2, the macroblock 3, and the macroblock 4 have been respectively coded based on the video coding processing method provided in this embodiment of the present application, a current to-be-coded macroblock is the macroblock 5.

Step S102: Obtain an inter-frame coding cost of the to-be-coded macroblock based on at least one inter-frame coding scheme.

The "at least one inter-frame coding scheme" includes the following several cases.

First case: A quantity of the at least one inter-frame coding scheme is less than a total quantity of inter-frame coding schemes.

Assuming that the total quantity of inter-frame coding schemes is M (where M is a positive integer), and the quantity of the at least one inter-frame coding scheme is N, N<M.

In step S102, coding costs of N (N<M) inter-frame coding schemes may be obtained, and a lowest coding cost is used as the inter-frame coding cost.

A coding cost calculation formula needs to be used in a process of obtaining the coding costs of the N inter-frame coding schemes. A non-simplified coding cost calculation formula or a simplified coding cost calculation formula may be used in the process of obtaining the coding costs of the N inter-frame coding schemes in step S102. A processing amount related to the non-simplified coding cost calculation formula is greater than or much greater than a processing amount related to the simplified coding cost calculation formula.

To further describe the processing amounts related to the simplified coding cost calculation formula and the non-simplified coding cost calculation formula, this embodiment of the present application provides, but is not limited to, the following described coding cost calculation formula cost.

$cost=D+\lambda \times R$. D is an error between a predictor of the to-be-coded macroblock that is obtained based on a coded video frame and the to-be-coded video frame and an actual value of the to-be-coded macroblock, and may be indicated based on a mean square error. $\lambda$ is a Lagrange multiplier. R is a number of bits of the to-be-coded macroblock on which entropy coding has been performed.

The simplified coding cost calculation formula may be $cost=D$.

A calculation process of D is relatively complex. First, an absolute error and a SAD between the predictor of the to-be-coded macroblock that is obtained based on the coded video frame and the to-be-coded video frame and the actual value of the to-be-coded macroblock are obtained, and then D is calculated based on SAD.

The simplified coding cost calculation formula in this embodiment of the present application may alternatively be $cost=SAD+\lambda \times R$ or $cost=SAD$.

In this embodiment of the present application, D and SAD are collectively referred to as error information obtained based on the coded video frame and the to-be-coded video frame.

In conclusion, because N<M, the processing amount in the process of obtaining the coding costs of the N inter-frame coding schemes is less than a processing amount in inter-frame predictive coding regardless of whether the simplified coding cost calculation formula is used.

Second case: A coding cost corresponding to the at least one inter-frame coding scheme is error information obtained based on a coded video frame and the to-be-coded video frame.

In the second case, a quantity of the inter-frame coding scheme is not limited, and the quantity N of the at least one inter-frame coding scheme<a total quantity M of inter-frame coding schemes. However, to decrease a processing amount in the "obtaining an inter-frame coding cost of the to-be-coded macroblock based on at least one inter-frame coding scheme", a simplified coding cost calculation formula needs to be used for a coding cost of at least one inter-frame coding scheme in a process of calculating the coding costs of the N inter-frame coding schemes.

It may be learned according to the first case and the second case that in an embodiment of this application, the quantity N of the at least one inter-frame coding scheme<the total quantity M of inter-frame coding schemes, and the simplified coding cost calculation formula is used in the process of calculating the coding costs of the N inter-frame coding schemes.

Step S103: Obtain an intra-frame coding cost of the to-be-coded macroblock based on at least one intra-frame coding scheme.

The "at least one intra-frame coding scheme" includes the following several cases.

First case: A quantity of the at least one intra-frame coding scheme is less than a total quantity of intra-frame coding schemes.

Assuming that the total quantity of intra-frame coding schemes is L (where L is a positive integer), and the quantity of the at least one intra-frame coding scheme is P, P<L.

For example, in intra-frame predictive coding, only four intra-frame coding schemes corresponding to a 4×4 macroblock may be selected from five intra-frame coding schemes corresponding to a 16×16 macroblock and nine intra-frame coding schemes corresponding to the 4×4 macroblock. In this scenario, P=4, and L=14.

In step S103, coding costs of P inter-frame coding schemes may be obtained, and a lowest coding cost is used as the intra-frame coding cost.

A coding cost calculation formula needs to be used in a process of obtaining the coding costs of the P intra-frame coding schemes. A non-simplified coding cost calculation formula or a simplified coding cost calculation formula may be used in the process of obtaining the coding costs of the P intra-frame coding schemes in step S103. A processing amount related to the non-simplified coding cost calculation formula is greater than or much greater than a processing amount related to the simplified coding cost calculation formula.

To further describe the processing amounts related to the simplified coding cost calculation formula and the non-simplified coding cost calculation formula, this embodiment of the present application provides, but is not limited to, the following described coding cost calculation formula cost.

$cost=D+\lambda \times R$. D is an error between a predictor of the to-be-coded macroblock that is obtained based on a coded macroblock in the to-be-coded video frame and the to-be-coded video frame and an actual value of the to-be-coded macroblock, and may be indicated based on a mean square error. $\lambda$ is a Lagrange multiplier. R is a number of bits of the to-be-coded macroblock on which entropy coding has been performed.

The simplified coding cost calculation formula may be $cost=D$.

A calculation process of D is relatively complex. First, an absolute error and a SAD between the predictor of the to-be-coded macroblock that is obtained based on the coded macroblock in the to-be-coded video frame and the to-becoded video frame and the actual value of the to-be-coded macroblock are obtained, and then D is calculated based on SAD.

The simplified coding cost calculation formula in this embodiment of the present application may alternatively be cost=SAD+λ×R or cost=SAD.

In this embodiment of the present application, D and SAD are collectively referred to as error information obtained based on the coded macroblock in the to-be-coded video frame and the to-be-coded video frame.

In conclusion, because P<L, the processing amount in the process of obtaining the coding costs of the P intra-frame coding schemes is less than a processing amount in the intra-frame predictive coding regardless of whether the simplified coding cost calculation formula is used.

Second case: A coding cost corresponding to the at least one intra-frame coding scheme is error information obtained based on a coded macroblock in the to-be-coded video frame and the to-be-coded video frame.

In the second case, a quantity of the intra-frame coding scheme is not limited, and the quantity P of the at least one intra-frame coding scheme≤a total quantity L of inter-frame coding schemes. However, to decrease a processing amount in the "obtaining an intra-frame coding cost of the to-be-coded macroblock based on at least one intra-frame coding scheme", a simplified coding cost calculation formula needs to be used for a coding cost of at least one intra-frame coding scheme in a process of calculating the coding costs of the P intra-frame coding schemes.

It may be learned according to the first case and the second case that in an embodiment of this application, the quantity P of the at least one intra-frame coding scheme<the total quantity L of intra-frame coding schemes, and the simplified coding cost calculation formula is used in the process of calculating the coding costs of the P intra-frame coding schemes.

There is no chronological order between step S102 and step S103. Step S102 and step S103 may be simultaneously performed. Alternatively, step S102 may be first performed and then step S103 is performed. Alternatively, step S103 may be first performed and then step S102 is performed.

Step S104: Compare the inter-frame coding cost with the intra-frame coding cost, to obtain a comparison result.

Step S105: Determine a coding scheme of the to-be-coded macroblock based on the comparison result, where the coding scheme includes intra-frame predictive coding and inter-frame predictive coding.

In this embodiment of the present application, when the comparison result indicates that the intra-frame coding cost is greater than A multiplied by the inter-frame coding cost, that is, the intra-frame coding cost>(A×the inter-frame coding cost), the coding scheme of the to-be-coded macroblock is determined as the inter-frame predictive coding. A is a coefficient greater than a first value.

When the comparison result indicates that the inter-frame coding cost is greater than B multiplied by the intra-frame coding cost, that is, the inter-frame coding cost>(B×the intra-frame coding cost), the coding scheme of the to-be-coded macroblock is determined as the intra-frame predictive coding. B is a coefficient greater than a second value.

The first value is greater than or equal to 1, and A may be any positive number, for example, 2 or 3, that is greater than 1.

The second value is greater than or equal to 1, and B may be any positive number, for example, 1.2, 1.5, or 2, that is greater than 1.

In step S102 and step S103, the inter-frame coding cost may be obtained based on some inter-frame coding schemes, and the intra-frame coding cost may be obtained based on some intra-frame coding schemes; or the intra-frame coding cost and the inter-frame coding cost may be obtained based on the simplified coding cost calculation formula. Therefore, whether the intra-frame predictive coding or the inter-frame predictive coding is used can only be roughly determined based on the comparison result between the inter-frame coding cost and the intra-frame coding cost. A specific coding scheme needs to be further determined.

Step S106: Code the to-be-coded macroblock according to the coding scheme.

If the coding scheme is the intra-frame predictive coding, a coding cost of each intra-frame coding scheme in the intra-frame predictive coding needs to be calculated in step S106, a coding scheme corresponding to a lowest coding cost is determined as an optimal coding scheme of the to-be-coded macroblock, and the to-be-coded macroblock is coded in the optimal coding scheme.

If the coding scheme is the inter-frame predictive coding, a coding cost of each inter-frame coding scheme in the inter-frame predictive coding needs to be calculated in step S106, a coding scheme corresponding to a lowest coding cost is determined as an optimal coding scheme of the to-be-coded macroblock, and the to-be-coded macroblock is coded in the optimal coding scheme.

To make a person skilled in the art better understand beneficial effects in this embodiment of the present application, a specific example is used below for description. Assuming that the quantity of "the at least one inter-frame coding scheme" in step S102 is 1, the quantity of "the at least one intra-frame coding scheme" in step S103 is 1, and the coding scheme determined in step S105 is the intra-frame predictive coding, the coding cost of each intra-frame coding scheme in the intra-frame predictive coding needs to be calculated in step S106. Assuming that the total quantity of intra-frame coding schemes is L, a processing amount in a macroblock coding process in this embodiment of the present application is 2+L. A processing amount in a macroblock coding process in the existing technology is L+M (the total quantity of inter-frame coding schemes). M is generally greater than 10. Therefore, the processing amount in the coding process can be reduced based on the method provided in this embodiment of the present application.

According to the video coding processing method provided in this embodiment of the present application, the inter-frame coding cost and the intra-frame coding cost may be obtained in a manner whose processing amount is less than or even much less than that in the inter-frame predictive coding and the intra-frame predictive coding. Then, the coding scheme, that is, the intra-frame predictive coding or the inter-frame predictive coding, of the to-be-coded macroblock is determined based on the comparison result between the inter-frame coding cost and the intra-frame coding cost, so that the to-be-coded macroblock can be coded only through the intra-frame predictive coding or the inter-frame predictive coding in the coding process, to decrease the processing amount in the coding process, and improve a processing speed and processing performance.

Further, in this embodiment of the present application, in the process of determining the coding scheme of the to-be-coded macroblock, the coding scheme is obtained based on the comparison result between the inter-frame coding cost and the intra-frame coding cost. The inter-frame coding cost and the intra-frame coding cost are both obtained based on the to-be-coded macroblock, that is, features such as texture, details, and edges of the to-be-coded video frame are combined, so that the coding scheme is more accurately determined.

If the inter-frame coding cost or the intra-frame coding cost is compared with a fixed value, the fixed value is unrelated to content of the to-be-coded macroblock. Therefore, if the coding scheme is determined based on a result obtained by comparing the inter-frame coding cost with the fixed value or based on a result obtained by comparing the intra-frame coding cost with the fixed value, the obtained coding scheme is inaccurate. For example, the to-be-coded video frame has many details, both the inter-frame coding cost and the intra-frame coding cost of the to-be-coded macroblock in the to-be-coded video frame may be greater than the corresponding fixed value. Therefore, a process of determining the coding scheme as the intra-frame predictive coding only because that the inter-frame coding cost is greater than the fixed value is inaccurate. This is perfectly avoided in this embodiment of the present application.

In the foregoing embodiment, there is a plurality of methods for the "determining a coding scheme of the to-be-coded macroblock based on the comparison result". This embodiment of the present application provides, but is not limited to, the following several methods: obtaining, based on the comparison result, a probability of performing the intra-frame predictive coding on the to-be-coded macroblock and a probability of performing the inter-frame predictive coding on the to-be-coded macroblock; and determining the coding scheme of the to-be-coded macroblock based on the probability of the intra-frame predictive coding and the probability of the inter-frame predictive coding.

The probability may be a probability event. A higher probability indicates a higher probability that coding performed in this manner is optimal.

In this embodiment of the present application, there is a plurality of methods for the "obtaining, based on the comparison result, a probability of performing the intra-frame predictive coding on the to-be-coded macroblock and a probability of performing the inter-frame predictive coding on the to-be-coded macroblock". This embodiment of the present application provides, but is not limited to, the following several methods.

First Method:

When the comparison result indicates that the intra-frame coding cost is greater than A multiplied by the inter-frame coding cost, it is determined that the probability of the intra-frame predictive coding is less than the probability of the inter-frame predictive coding.

In this embodiment of the present application, the coding scheme of the to-be-coded macroblock is further determined as the inter-frame predictive coding. A is a coefficient greater than a first value.

When the comparison result indicates that the inter-frame coding cost is greater than B multiplied by the intra-frame coding cost, it is determined that the probability of the inter-frame predictive coding is less than the probability of the intra-frame predictive coding.

In this embodiment of the present application, the coding scheme of the to-be-coded macroblock is further determined as the intra-frame predictive coding, and B is a coefficient greater than a second value.

Second Method:

Coding schemes of K neighboring coded macroblocks of the to-be-coded macroblock are obtained, where K is a positive integer.

The probability of the intra-frame predictive coding and the probability of the inter-frame predictive coding are obtained based on the comparison result and the coding schemes of the K neighboring coded macroblocks.

A different location of the to-be-coded macroblock in the to-be-coded video frame causes a different specific value of K. Still using FIG. 2 as an example, if the macroblock 1 is the to-be-coded macroblock, K is 0. If the macroblock 2 is the to-be-coded macroblock, K is 1, and a coded macroblock neighboring to the macroblock 2 is the macroblock 1. If the macroblock 3 is the to-be-coded macroblock, K is 1, and a coded macroblock neighboring to the macroblock 3 is the macroblock 2. If the macroblock 4 is the to-be-coded macroblock, K is 2, and coded macroblocks neighboring to the macroblock 4 are the macroblock 1 and the macroblock 2. If the macroblock 5 is the to-be-coded macroblock, K is 4, and coded macroblocks neighboring to the macroblock 5 are the macroblock 1, the macroblock 2, the macroblock 3, and the macroblock 4.

In conclusion, "neighboring" defined in this embodiment of the present application means that a left macroblock (for example, the macroblock 4), a right macroblock (for example, the macroblock 6), an upper left macroblock (for example, the macroblock 1), an upper macroblock (for example, the macroblock 2), an upper right macroblock (for example, the macroblock 3), a lower left macroblock (for example, the macroblock 7), a lower macroblock (for example, the macroblock 8), and a lower right macroblock (for example, the macroblock 9) are all neighboring to the to-be-coded macroblock (assumed as the macroblock 5).

A different manner of traversing the to-be-coded video frame causes a different value of K. for example, in top-to-bottom and left-to-right directions, the value of K may be 0, 1, 2, or 4. The value of K may correspondingly change in another traverse manner.

The second method is based on a principle that a coding type of the to-be-coded macroblock is very probably the same as the coding scheme of the coded macroblock neighboring to the to-be-coded macroblock.

In step S102 and step S103, the inter-frame coding cost may be obtained based on some inter-frame coding schemes and the inter-frame coding cost may be obtained based on some intra-frame coding schemes; or the intra-frame coding cost and the inter-frame coding cost may be obtained based on the simplified coding cost calculation formula. Therefore, there is an error when the inter-frame coding cost and the intra-frame coding cost are based upon. In addition, a macroblock located at an edge of a video frame may have fewer details than a macroblock not located at the edge of the video frame, and the macroblock located at the edge of the video frame have more edge features than those of the macroblock not located at the edge of the video frame. Therefore, a coding scheme of the macroblock located at the edge of the video frame is very probably different from a coding scheme of a neighboring coded macroblock, and a coding scheme of the macroblock not located at the edge of the video frame is very probably the same as a coding scheme of a neighboring coded macroblock.

Therefore, the comparison result, the coding schemes of the K neighboring coded macroblocks, and the location of the to-be-coded macroblock in the to-be-coded video frame may be combined, to more accurately determine the probability of the intra-frame predictive coding and the probability of the inter-frame predictive coding.

There is a plurality of implementation methods provided in this embodiment of the present application for the "obtaining the probability of the intra-frame predictive coding and the probability of the inter-frame predictive coding based on the comparison result and the coding schemes of the K neighboring coded macroblocks". This embodiment of the present application provides, but is not limited to, the following methods: setting the probability of the inter-frame predictive coding is set to a first value when the comparison result indicates that the intra-frame coding cost is greater than A multiplied by the inter-frame coding cost, and determining the probability of the intra-frame predictive coding based on a location of the to-be-coded macroblock in the to-be-coded video frame and the coding schemes of the K neighboring coded macroblocks, where A is a coefficient greater than a first value; or setting the probability of the intra-frame predictive coding is set to a second value when the comparison result indicates that the inter-frame coding cost is greater than B multiplied by the intra-frame coding cost, and determining the probability of the inter-frame predictive coding based on a location of the to-be-coded macroblock in the to-be-coded video frame and the coding schemes of the K neighboring coded macroblocks, where B is a coefficient greater than a second value.

In this embodiment of the present application, when the coding scheme is the inter-frame predictive coding or the intra-frame predictive coding, a processing amount in the entire video coding processing method is less than a sum of the processing amounts in the inter-frame predictive coding and the intra-frame predictive coding in the existing technology.

In this embodiment of the present application, the coding scheme is the inter-frame predictive coding when the to-be-coded macroblock has the following features. The "determining the probability of the intra-frame predictive coding based on a location of the to-be-coded macroblock in the to-be-coded video frame and the coding schemes of the K neighboring coded macroblocks" includes: setting the probability of the intra-frame predictive coding to a third value when the to-be-coded macroblock is located at an edge of the to-be-coded video frame; or setting the probability of the intra-frame predictive coding to a fourth value when the to-be-coded macroblock is not located at an edge of the to-be-coded video frame and a quantity of coded macroblocks whose coding schemes are the intra-frame predictive coding in the K neighboring coded macroblocks is less than a third value.

The third value may be a positive integer greater than or equal to 1.

Correspondingly, when the probability of the inter-frame predictive coding is the first preset value, the determining the coding scheme of the to-be-coded macroblock based on the probability of the intra-frame predictive coding and the probability of the inter-frame predictive coding includes: determining, when the probability of the intra-frame predictive coding is the third preset value, that the coding scheme of the to-be-coded macroblock includes first performing the inter-frame predictive coding and then determining, based on a result of the inter-frame predictive coding, that the intra-frame predictive coding does not need to be performed; or determining the coding scheme of the to-be-coded macroblock as the inter-frame predictive coding when the probability of the intra-frame predictive coding is the fourth preset value.

Processing amounts in the foregoing two cases are both less than the sum of the processing amounts in the inter-frame predictive coding and the intra-frame predictive coding in the existing technology.

In this embodiment of the present application, the coding scheme is the intra-frame predictive coding when the to-be-coded macroblock has the following features. The "determining the probability of the inter-frame predictive coding based on a location of the to-be-coded macroblock in the to-be-coded video frame and the coding schemes of the K neighboring coded macroblocks" includes: setting the probability of the inter-frame predictive coding to a fifth preset value when the to-be-coded macroblock is located at an edge of the to-be-coded video frame; or setting the probability of the inter-frame predictive coding to a sixth preset value when the to-be-coded macroblock is not located at an edge of the to-be-coded video frame and a quantity of coded macroblocks whose coding schemes are the intra-frame predictive coding in the K neighboring coded macroblocks is greater than or equal to a fourth value.

The fourth value may be a positive integer greater than or equal to 1.

Correspondingly, when the probability of the intra-frame predictive coding is the second preset value, the determining the coding scheme of the to-be-coded macroblock based on the probability of the intra-frame predictive coding and the probability of the inter-frame predictive coding includes: determining, when the probability of the inter-frame predictive coding is the fifth preset value, that the coding scheme of the to-be-coded macroblock includes first performing the intra-frame predictive coding and then determining, based on a result of the intra-frame predictive coding, that the inter-frame predictive coding does not need to be performed; or determining the coding scheme of the to-be-coded macroblock as the intra-frame predictive coding when the probability of the inter-frame predictive coding is the sixth preset value.

When the coding scheme is the first performing the intra-frame predictive coding and then determining, based on a result of the intra-frame predictive coding, that the inter-frame predictive coding does not need to be performed and when the coding scheme is performing the intra-frame predictive coding only, the processing amount in the video coding processing method provided in this embodiment of the present application is less than the sum of the processing amounts in the inter-frame predictive coding and the intra-frame predictive coding in the existing technology.

It may be understood that the inter-frame coding cost obtained in step S102 and the intra-frame coding cost obtained in step S103 each have an error. Therefore, if the coding scheme is the intra-frame predictive coding only or the inter-frame predictive coding only, an optimal coding scheme may be missed. To make the technical solution more complete, the coding scheme provided in this embodiment of the present application may further include: simultaneously performing the inter-frame predictive coding and the intra-frame predictive coding; or first performing the inter-frame predictive coding and then determining, based on a result of the inter-frame predictive coding, that the intra-frame predictive coding needs to be performed; or first performing the intra-frame predictive coding and then determining, based on a result of the intra-frame predictive coding, that the inter-frame predictive coding needs to be performed.

In a complete technical solution, there may be the foregoing five different coding schemes. In this embodiment of the present application, the first performing the inter-frame predictive coding and then determining, based on a result of the inter-frame predictive coding, that the intra-frame predictive coding needs to be performed and the first performing the inter-frame predictive coding and then determining, based on a result of the inter-frame predictive coding, that the intra-frame predictive coding does not need to be performed are collectively referred to as one coding scheme. That is, the first performing the inter-frame predictive coding and then determining, based on a result of the inter-frame predictive coding, whether the intra-frame predictive coding needs to be performed.

The first performing the intra-frame predictive coding and then determining, based on a result of the intra-frame predictive coding, that the inter-frame predictive coding needs to be performed and the first performing the intra-frame predictive coding and then determining, based on a result of the intra-frame predictive coding, that the inter-frame predictive coding does not need to be performed are collectively referred to as one coding scheme. That is, first performing the intra-frame predictive coding and then determining, based on a result of the intra-frame predictive coding, whether the inter-frame predictive coding needs to be performed.

Although a processing amount in some coding schemes is greater than the processing amounts in the inter-frame predictive coding and the intra-frame predictive coding, in an application scenario of coding massive macroblocks, a sum of processing amounts in a process of coding the massive macroblocks based on the video coding processing method provided in this embodiment of the present application is less than or even much less than the sum of the processing amounts in the inter-frame predictive coding and the intra-frame predictive coding in the existing technology.

In conclusion, according to the video coding processing method provided in this embodiment of the present application, the processing amount in the coding process is decreased.

Five cases are set for the foregoing five different coding schemes. Details are described as follows:

When the comparison result indicates that the intra-frame coding cost is greater than A multiplied by the inter-frame coding cost and the probability of the inter-frame predictive coding is the first preset value, the determining the probability of the intra-frame predictive coding based on a location of the to-be-coded macroblock in the to-be-coded video frame and the coding schemes of the K neighboring coded macroblocks may specifically include the following three cases:

Case one: The probability of the intra-frame predictive coding is set to the third preset value when the to-be-coded macroblock is located at the edge of the to-be-coded video frame.

If the to-be-coded macroblock is located at the edge of the to-be-coded video frame, the edge may have features such as color and lightness that may suddenly change. Therefore, the probability of the intra-frame predictive coding cannot be simply determined based on the coding schemes of the K neighboring coded macroblocks.

In Case one, the probability of the intra-frame predictive coding exists. Therefore, the probability of the intra-frame predictive coding is set to the third preset value.

Case two: The probability of the intra-frame predictive coding is set to the second preset value when the to-be-coded macroblock is not located at the edge of the to-be-coded video frame and the quantity of coded macroblocks whose coding schemes are the intra-frame predictive coding in the K neighboring coded macroblocks is greater than or equal to the third value.

The third value may be a positive integer greater than or equal to 1.

If the quantity of coded macroblocks whose coding schemes are the intra-frame predictive coding in the K neighboring coded macroblocks is greater than or equal to the third value, it indicates that the intra-frame predictive coding is very probably performed on the to-be-coded macroblock. Therefore, the probability of the intra-frame predictive coding is set to the second preset value.

Case three: The probability of the intra-frame predictive coding is set to the fourth preset value when the to-be-coded macroblock is not located at the edge of the to-be-coded video frame and the quantity of coded macroblocks whose coding schemes are the intra-frame predictive coding in the K neighboring coded macroblocks is less than the third value.

If the quantity of coded macroblocks whose coding schemes are the intra-frame predictive coding in the K neighboring coded macroblocks is less than the third value, it indicates that the intra-frame predictive coding cannot be performed on the to-be-coded macroblock. Therefore, the probability of the intra-frame predictive coding is set to the fourth preset value.

The first preset value, the second preset value, the third preset value, and the fourth preset value may be any numbers or symbols, and may have no value relationship with each other.

In this embodiment of the present application, the first preset value is equal to the second preset value, the first preset value is greater than the third preset value, and the third preset value is greater than the fourth preset value.

To enable a person skilled in the art to better understand a relationship between the first preset value, the second preset value, the third preset value, and the fourth preset value, a specific example is used below. This embodiment of the present application provides, but is not limited to, the following specific example.

It is assumed that the intra-frame coding cost of the to-be-coded macroblock is $Intra_{cost}$, the inter-frame coding cost is $Inter_{cost}$, the manner of traversing each macroblock in the to-be-coded video frame is in top-to-bottom and left-to-right directions, a maximum value of K is 4, and the quantity of coded macroblocks whose coding schemes are the intra-frame predictive coding in the K neighboring coded macroblocks is $Num_{intra}$.

In this embodiment of the present application, the probability $Prob_{intra}$ of the intra-frame predictive coding is first initially set to 2 (the second preset value), and the probability $Prob_{inter}$ of the inter-frame predictive coding is set to 2 (the first preset value). If $Intra_{cost} > A*Inter_{cost}$, the probability $Prob_{intra}$ of the intra-frame predictive coding is set to 0 (the fourth preset value).

Case one: If K<4 (that is, the to-be-coded macroblock is located at the edge of the to-be-coded video frame), and the probability $Prob_{intra}$ of the intra-frame predictive coding is 0 (the fourth preset value), the probability $Prob_{intra}$ of the intra-frame predictive coding is reset to 1 (the third preset value).

Case two: If K=4 (that is, the to-be-coded macroblock is not located at the edge of the to-be-coded video frame), and $Num_{intra} \geq 1$ (the third value), the probability $Prob_{intra}$ of the intra-frame predictive coding is set to 2 (the second preset value).

Case three: If K=4 (that is, the to-be-coded macroblock is not located at the edge of the to-be-coded video frame), and $Num_{intra} < 1$ (the third value), the probability $Prob_{intra}$ of the intra-frame predictive coding is set to 0 (the fourth preset value).

When the probability of the inter-frame predictive coding is the first preset value, the determining the coding scheme of the to-be-coded macroblock based on the probability of the intra-frame predictive coding and the probability of the inter-frame predictive coding includes the following several cases:

When the probability of the intra-frame predictive coding is the third preset value (that is, in Case one), the coding scheme of the to-be-coded macroblock is determined as the first performing the inter-frame predictive coding and then determining, based on a result of the inter-frame predictive coding, whether the intra-frame predictive coding needs to be performed.

When the probability of the intra-frame predictive coding is the second preset value (that is, in Case two), the coding scheme of the to-be-coded macroblock is determined as the simultaneously performing the intra-frame predictive coding and the inter-frame predictive coding.

When the probability of the intra-frame predictive coding is the fourth preset value (that is, in Case three), the coding scheme of the to-be-coded macroblock is determined as the inter-frame predictive coding.

Figure 3:
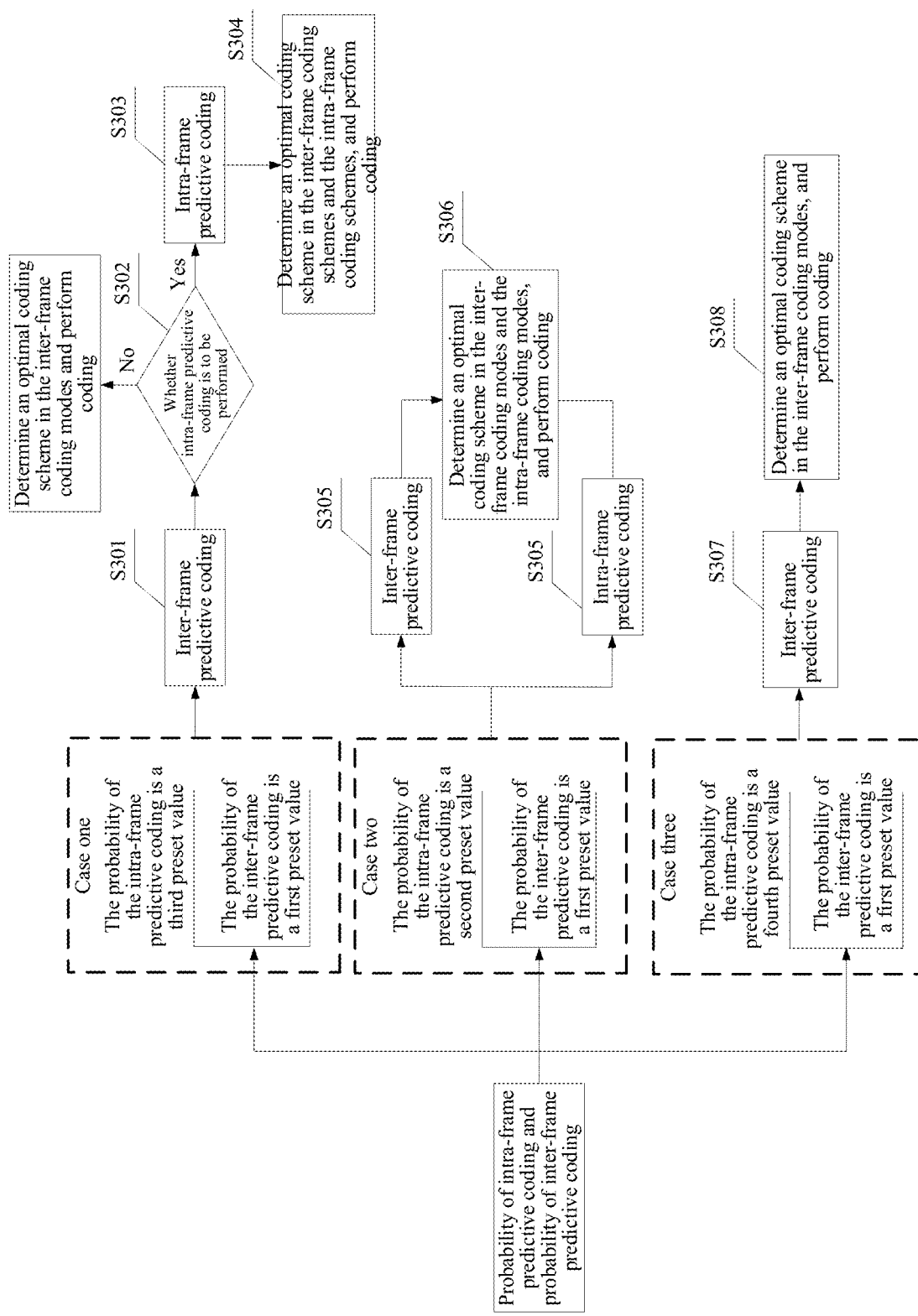
FIG. 3 is a schematic diagram of a process of coding a to-be-coded macroblock in different cases according to an embodiment of this application.

FIG. 3 is a schematic diagram of a process of coding a to-be-coded macroblock in different cases according to an embodiment of this application.

In Case one, the "coding the to-be-coded macroblock according to the coding scheme" includes the following steps:

Step S301: Perform inter-frame predictive coding, where an execution process of the inter-frame predictive coding may include: calculating a coding cost of each inter-frame coding scheme in the inter-frame predictive coding.

Step S302: Determine whether intra-frame predictive coding is to be performed, where a specific process may include: obtaining a prediction error and a bit rate of a first coding scheme corresponding to the lowest one of the coding cost of each inter-frame coding scheme.

When the prediction error of the first coding scheme is less than a first preset error value and the bit rate is less than a first preset bit rate value, the first coding scheme is determined as an optimal coding scheme of the to-be-coded macroblock, and the to-be-coded macroblock is coded in the first coding scheme. Otherwise, step S303 is performed.

The bit rate refers to a sampling rate. A higher sampling rate per unit time indicates higher precision and higher approximation of an obtained video to an original video. For a same video frame, a higher bit rate indicates a larger data amount.

Step S303: Perform the intra-frame predictive coding, where an execution process of the intra-frame predictive coding may include: calculating a coding cost of each intra-frame coding scheme in the intra-frame predictive coding.

Step S304: Determine a second coding scheme corresponding to the lowest one of the coding cost of each inter-frame coding scheme and the coding cost of each intra-frame coding scheme, determine the second coding scheme as an optimal coding scheme of the to-be-coded macroblock, and code the to-be-coded macroblock in the second coding scheme.

In Case two, the "coding the to-be-coded macroblock according to the coding scheme" includes the following steps:

Step S305: Perform inter-frame predictive coding and intra-frame predictive coding, where a specific execution process may include: calculating a coding cost of each inter-frame coding scheme and a coding cost of each intra-frame scheme.

Step S306: Determine a third coding scheme corresponding to a lowest coding cost in the inter-frame coding schemes and the intra-frame coding schemes as an optimal coding scheme, and code the to-be-coded macroblock based on the third coding scheme.

In Case three, the "coding the to-be-coded macroblock according to the coding scheme" includes the following steps:

Step S307: Perform inter-frame predictive coding.

Step S308: Determine a fourth coding scheme corresponding to a lowest coding cost in the inter-frame coding schemes as an optimal coding scheme, and code the to-be-coded macroblock in the fourth coding scheme.

One to-be-coded macroblock corresponds only to one of the foregoing cases. Therefore, there is no chronological order between the steps in Case one, Case two, and Case three.

When the comparison result indicates that the inter-frame coding cost is greater than B multiplied by the intra-frame coding cost and the probability of the intra-frame predictive coding is set to the second preset value, there may be the following several cases of the determining the probability of the inter-frame predictive coding based on a location of the to-be-coded macroblock in the to-be-coded video frame and the coding schemes of the K neighboring coded macroblocks:

Case four: The probability of the inter-frame predictive coding is set to the fifth preset value when the to-be-coded macroblock is located at the edge of the to-be-coded video frame.

Case five: The probability of the inter-frame predictive coding is set to the sixth preset value when the to-be-coded macroblock is not located at the edge of the to-be-coded video frame and the quantity of coded macroblocks whose coding schemes are the intra-frame predictive coding in the K neighboring coded macroblocks is greater than or equal to the fourth value.

Case six: The probability of the inter-frame predictive coding is set to the first preset value when the to-be-coded macroblock is not located at the edge of the to-be-coded video frame and the quantity of coded macroblocks whose coding schemes are the intra-frame predictive coding in the K neighboring coded macroblocks is less than the fourth value.

Values of the probability of the inter-frame predictive coding and the probability of the intra-frame predictive coding that are obtained in Case six are the same as those obtained in Case two. Therefore, Case six and Case two are collectively referred to as Case two.

The first preset value, the second preset value, the third preset value, the fourth preset value, the fifth preset value, and the sixth preset value may be any numbers or symbols, and may have no value relationship with each other.

To enable a person skilled in the art to better understand a relationship between the first preset value, the second preset value, the fifth preset value, and the sixth preset value, a specific example is used below. This embodiment of the present application provides, but is not limited to, the following specific example.

It is assumed that the intra-frame coding cost of the to-be-coded macroblock is $Intra_{cost}$, the inter-frame coding cost is $Inter_{cost}$, the manner of traversing each macroblock in the to-be-coded video frame is in top-to-bottom and left-to-right directions, a maximum value of K is 4, and the quantity of coded macroblocks whose coding schemes are the intra-frame predictive coding in the K neighboring coded macroblocks is $Num_{intra}$.

In this embodiment of the present application, the probability $Prob_{intra}$ of the intra-frame predictive coding is first initially set to 2 (the second preset value), and the probability $Prob_{inter}$ of the inter-frame predictive coding is set to 2

(the first preset value). If $Inter_{cost}>B*Intra_{cost}$, the probability $Prob_{inter}$ of the inter-frame predictive coding is set to 0 (the sixth preset value).

Case four: If K<4 (that is, the to-be-coded macroblock is located at the edge of the to-be-coded video frame), and the probability $Prob_{inter}$ of the inter-frame predictive coding is 0 (the sixth preset value), the probability $Prob_{inter}$ of the inter-frame predictive coding is reset to 1 (the fifth preset value).

Case five: If K=4 (that is, the to-be-coded macroblock is not located at the edge of the to-be-coded video frame), and $Num_{intra}\geq 1$ (the fourth value), the probability $Prob_{inter}$ of the inter-frame predictive coding is set to 0 (the sixth preset value).

Case two: If K=4 (that is, the to-be-coded macroblock is not located at the edge of the to-be-coded video frame), and $Num_{intra}<1$ (the fourth value), the probability $Prob_{inter}$ of the inter-frame predictive coding is set to 2 (the first preset value).

Correspondingly, when the probability of the intra-frame predictive coding is the second preset value, the determining the coding scheme of the to-be-coded macroblock based on the probability of the intra-frame predictive coding and the probability of the inter-frame predictive coding includes: determining, when the probability of the inter-frame predictive coding is the first preset value (that is, in Case two), the coding scheme of the to-be-coded macroblock as the simultaneously performing the intra-frame predictive coding and the inter-frame predictive coding; or determining, when the probability of the inter-frame predictive coding is the fifth preset value (that is, in Case four), the coding scheme of the to-be-coded macroblock as the first performing the intra-frame predictive coding and then determining, based on a result of the intra-frame predictive coding, whether the inter-frame predictive coding needs to be performed; or determining the coding scheme of the to-be-coded macroblock as the intra-frame predictive coding when the probability of the inter-frame predictive coding is the sixth preset value (that is, in Case five).

Figure 4:
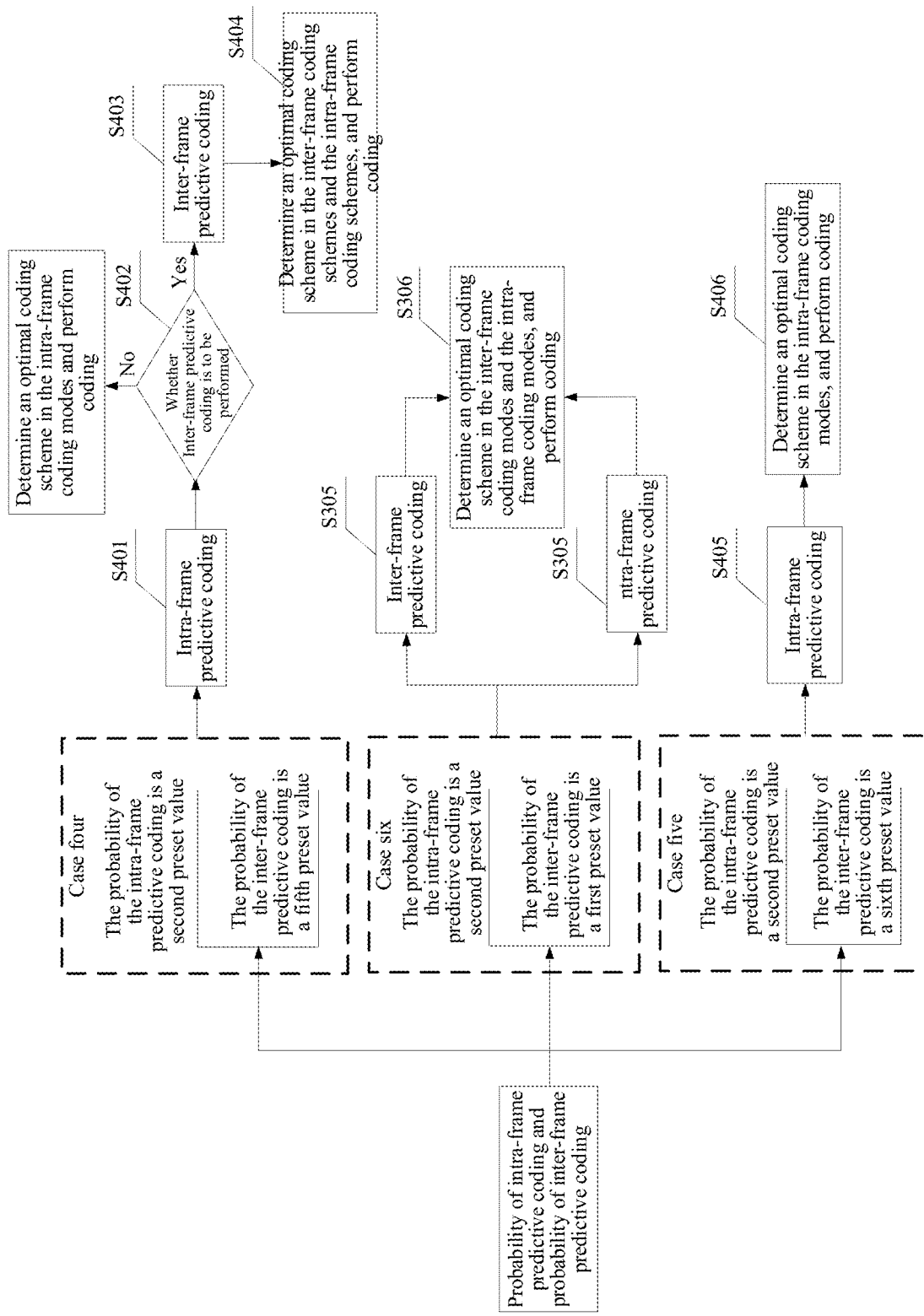
FIG. 4 is a schematic diagram of a process of coding a to-be-coded macroblock in different cases according to an embodiment of this application.

FIG. 4 is a schematic diagram of a process of coding a to-be-coded macroblock in different cases according to an embodiment of this application.

In Case four, the "coding the to-be-coded macroblock according to the coding scheme" includes the following steps:

Step S401: Perform intra-frame predictive coding, where an execution process of the intra-frame predictive coding may include: calculating a coding cost of each intra-frame coding scheme in the intra-frame predictive coding.

Step S402: Determine whether inter-frame predictive coding is to be performed, where a specific process may include: obtaining a prediction error and a bit rate of a fifth coding scheme corresponding to the lowest one of the coding cost of each intra-frame coding scheme.

When the prediction error of the fifth coding scheme is less than a second preset error value and the bit rate is less than a second preset bit rate value, the fifth coding scheme is determined as an optimal coding scheme of the to-be-coded macroblock, and the to-be-coded macroblock is coded in the fifth coding scheme. Otherwise, step S403 is performed.

Step S403: Perform the inter-frame predictive coding, where an execution process of the inter-frame predictive coding may include: calculating a coding cost of each inter-frame coding scheme in the inter-frame predictive coding.

Step S404: Determine a sixth coding scheme corresponding to the lowest one of the coding cost of each inter-frame coding scheme and the coding cost of each intra-frame coding scheme, determine the sixth coding scheme as an optimal coding scheme of the to-be-coded macroblock, and code the to-be-coded macroblock in the sixth coding scheme.

In Case five, the "coding the to-be-coded macroblock according to the coding scheme" includes the following steps:

Step S405: Perform intra-frame predictive coding.

Step S406: Determine a seventh coding scheme corresponding to a lowest coding cost in the intra-frame coding schemes as an optimal coding scheme, and code the to-be-coded macroblock in the seventh coding scheme.

A method for "coding the to-be-coded macroblock according to the coding scheme" in Case six is the same as that in Case two, and details are not described herein again.

In conclusion, in the foregoing five cases, a correspondence between the values of the probability of the intra-frame predictive coding and of the probability of the inter-frame predictive coding and the coding scheme is shown in Table 1.

TABLE 1

Correspondence between values of a probability of intra-frame predictive coding and a probability of inter-frame predictive coding, and a coding scheme

| | Probability of intra-frame predictive coding | Probability of inter-frame predictive coding | Coding scheme |
|---|---|---|---|
| Case one | Third preset value | First preset value | First perform the inter-frame predictive coding and then determine, based on a result of the inter-frame predictive coding, whether the intra-frame predictive coding needs to be performed |
| Case two | Second preset value | First preset value | Simultaneously perform the intra-frame predictive coding and the inter-frame predictive coding |
| Case three | Fourth preset value | First preset value | Perform the inter-frame predictive coding only |
| Case four | Second preset value | Fifth preset value | First perform the intra-frame predictive coding and then determine, based on a result of the intra-frame predictive coding, whether the inter-frame predictive coding needs to be performed |
| Case five | Second preset value | Sixth preset value | Perform the intra-frame predictive coding only |

Figure 5:
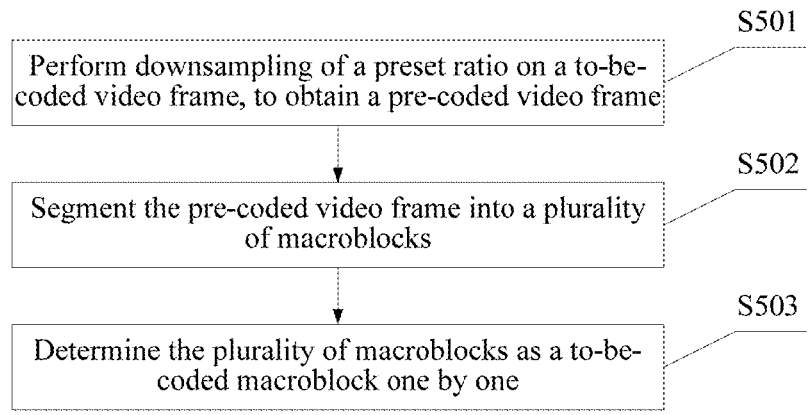
FIG. 5 is a flowchart of a method for identifying a to-be-coded macroblock in a to-be-coded video frame according to an embodiment of this application.

To further decrease the processing burden, down-sampling may be performed on the to-be-coded video frame. The down-sampling means performing sampling on a sample sequence at intervals of several samples. In this way, an obtained new sequence is down-sampling of an original sequence. FIG. 5 is a flowchart of a method for identifying a to-be-coded macroblock in a to-be-coded video frame according to an embodiment of this application. The method includes the following steps:

Step S501: Perform down-sampling of a preset ratio on the to-be-coded video frame, to obtain a pre-coded video frame.

The preset ratio may be 2:1, 3:1, 4:1, or the like. To avoid a large difference between details of the pre-coded video frame obtained through the down-sampling and details of the to-be-coded video frame, preferably, the preset ratio is 2:1.

Assuming that a length of the to-be-coded video frame is a and a width is b, and down-sampling having a preset ratio of 2:1 is performed, a length of the pre-coded video frame is a/2 and a width is b/2.

It may be understood that the pre-coded video frame needs to be segmented. Therefore, to ensure that the pre-coded video frame can be segmented into a plurality of macroblocks, a length and a width of a video frame obtained through the down-sampling need to be adjusted. Specifically, the "performing down-sampling of a preset ratio on the to-be-coded video frame, to obtain a pre-coded video frame" includes: performing the down-sampling of the preset ratio on the to-be-coded video frame, to obtain a target video frame; and adjusting the target video frame, to obtain the adjusted pre-coded video frame, so that a length of the pre-coded video frame is an integer multiple of a length of the to-be-coded macroblock, and a width of the pre-coded video frame is an integer multiple of a width of the to-be-coded macroblock.

If a length of the target video frame is an integer multiple of the length of the to-be-coded macroblock, and a width of the target video frame is the integer multiple of the width of the to-be-coded macroblock, the target video frame does not need to be adjusted.

Assuming that the to-be-coded macroblock is an 8×8 macroblock, the length of the pre-coded video frame needs to be an integer multiple of 8, and the width of the pre-coded video frame also needs to be the integer multiple of 8. If the to-be-coded macroblock is an 8×4 macroblock, the length of the pre-coded video frame needs to be an integer multiple of 8, and the width of the pre-coded video frame also needs to be the integer multiple of 4.

If the to-be-coded macroblock is the 8×8 macroblock, an original macroblock corresponding to the to-be-coded macroblock is a 16×16 macroblock. A quantity of pixels included in a macroblock on which the down-sampling has been performed is less than a quantity of pixels included in a macroblock on which the down-sampling is not performed. Therefore, a processing amount is relatively small.

Step S502: Segment the pre-coded video frame into a plurality of macroblocks.

Step S503: Determine the plurality of macroblocks as the to-be-coded macroblock one by one.

An embodiment of this application further provides a video coding processing apparatus corresponding to the video coding processing method. The video coding processing apparatus is described below. The video coding processing apparatus and the video coding processing method may be mutually referenced, and details are not described herein again.

Figure 6:
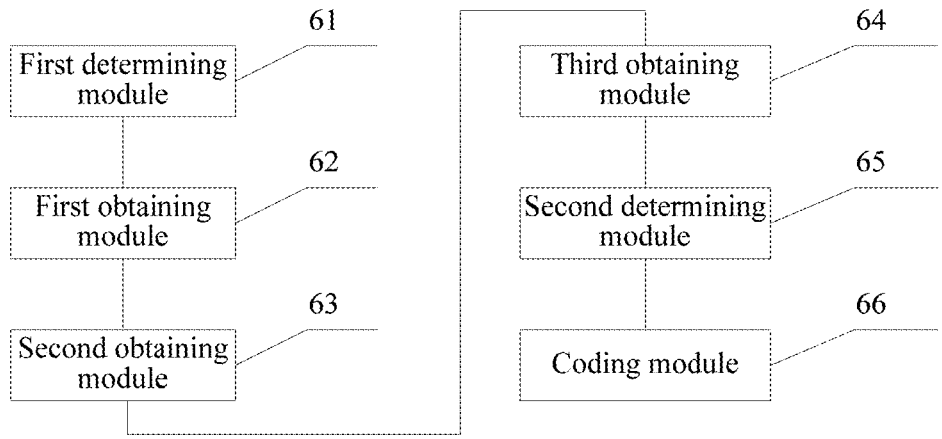
FIG. 6 is a structural diagram of a video coding processing apparatus according to an embodiment of this application.

FIG. 6 is a structural diagram of a video coding processing apparatus according to an embodiment of this application. The apparatus includes: a first determining module 61, configured to determine a to-be-coded macroblock in a to-be-coded video frame.

The apparatus further includes a first obtaining module 62, configured to obtain an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame.

The apparatus further includes a second obtaining module 63, configured to obtain an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame.

The apparatus further includes a third obtaining module 64, configured to compare the inter-frame coding cost with the intra-frame coding cost, to obtain a comparison result.

The apparatus further includes a second determining module 65, configured to determine a coding scheme of the to-be-coded macroblock based on the comparison result, the coding scheme including intra-frame predictive coding and inter-frame predictive coding; and a coding module 66, configured to code the to-be-coded macroblock according to the coding scheme.

In this embodiment of the present application, the second determining module 65 includes: a third determining unit, configured to determine the coding scheme of the to-be-coded macroblock as the inter-frame predictive coding when the comparison result indicates that the intra-frame coding cost is greater than A multiplied by the inter-frame coding cost, where A is a coefficient greater than a first value; and a fourth determining unit, configured to determine the coding scheme of the to-be-coded macroblock as the intra-frame predictive coding when the comparison result indicates that the inter-frame coding cost is greater than B multiplied by the intra-frame coding cost, where B is a coefficient greater than a second value.

In this embodiment of the present application, the second determining module 65 includes: a first obtaining unit, configured to obtain, based on the comparison result, a probability of performing the intra-frame predictive coding on the to-be-coded macroblock and a probability of performing the inter-frame predictive coding on the to-be-coded macroblock; and a first determining unit, configured to determine the coding scheme of the to-be-coded macroblock based on the probability of the intra-frame predictive coding and the probability of the inter-frame predictive coding.

In this embodiment of the present application, the first obtaining unit includes: a first obtaining subunit, configured to obtain coding schemes of K neighboring coded macroblocks of the to-be-coded macroblock, where K is a positive integer; and a second obtaining subunit, configured to obtain the probability of the intra-frame predictive coding and the probability of the inter-frame predictive coding based on the comparison result and the coding schemes of the K neighboring coded macroblocks.

In this embodiment of the present application, the second obtaining subunit includes: a first setting subunit, configured to set the probability of the inter-frame predictive coding to a first preset value when the comparison result indicates that the intra-frame coding cost is greater than A multiplied by the inter-frame coding cost, and determine the probability of the intra-frame predictive coding based on a location of the to-be-coded macroblock in the to-be-coded video frame and the coding schemes of the K neighboring coded macroblocks, where A is a coefficient greater than a first value; and a second setting subunit, configured to set the probability of the intra-frame predictive coding to a second preset value when the comparison result indicates that the inter-frame coding cost is greater than B multiplied by the intra-frame coding cost, and determine the probability of the inter-frame predictive coding based on the location of the to-be-coded macroblock in the to-be-coded video frame and the coding schemes of the K neighboring coded macroblocks, where B is a coefficient greater than a second value.

In this embodiment of the present application, the first setting subunit includes: a first setting sub-module, configured to set the probability of the intra-frame predictive coding to a third preset value when the to-be-coded macroblock is located at an edge of the to-be-coded video frame; a second setting sub-module, configured to set the probability of the intra-frame predictive coding to the second preset value when the to-be-coded macroblock is not located at the edge of the to-be-coded video frame and the quantity of coded macroblocks whose coding schemes are the intra-frame predictive coding in the K neighboring coded macroblocks is greater than or equal to a third value; and a third setting sub-module, configured to set the probability of the intra-frame predictive coding to a fourth preset value when the to-be-coded macroblock is not located at the edge of the to-be-coded video frame and the quantity of coded macroblocks whose coding schemes are the intra-frame predictive coding in the K neighboring coded macroblocks is less than the third value.

In this embodiment of the present application, the coding scheme further includes: simultaneously performing the intra-frame predictive coding and the inter-frame predictive coding; or first performing the inter-frame predictive coding and then determining, based on a result of the inter-frame predictive coding, whether the intra-frame predictive coding needs to be performed.

When the probability of the inter-frame predictive coding is the first preset value, the first determining unit includes: a first determining subunit, configured to determine, when the probability of the intra-frame predictive coding is the second preset value, the coding scheme of the to-be-coded macroblock as the simultaneously performing the intra-frame predictive coding and the inter-frame predictive coding; a second determining subunit, configured to determine the coding scheme of the to-be-coded macroblock as the inter-frame predictive coding when the probability of the intra-frame predictive coding is the fourth preset value; and a third determining subunit, configured to determine, when the probability of the intra-frame predictive coding is the third preset value, the coding scheme of the to-be-coded macroblock as the first performing the inter-frame predictive coding and then determining, based on a result of the inter-frame predictive coding, whether the intra-frame predictive coding needs to be performed.

In this embodiment of the present application, the second setting subunit includes: a fourth setting sub-module, configured to set the probability of the inter-frame predictive coding to a fifth preset value when the to-be-coded macroblock is located at an edge of the to-be-coded video frame; a fifth setting sub-module, configured to set the probability of the inter-frame predictive coding to a sixth preset value when the to-be-coded macroblock is not located at the edge of the to-be-coded video frame and a quantity of coded macroblocks whose coding schemes are the intra-frame predictive coding in the K neighboring coded macroblocks is greater than or equal to a fourth value; and a sixth setting sub-module, configured to set the probability of the inter-frame predictive coding to the first preset value when the to-be-coded macroblock is not located at the edge of the to-be-coded video frame and the quantity of coded macroblocks whose coding schemes are the intra-frame predictive coding in the K neighboring coded macroblocks is less than the fourth value.

In this embodiment of the present application, the coding scheme further includes: simultaneously performing the intra-frame predictive coding and the inter-frame predictive coding; or first performing the intra-frame predictive coding and then determining, based on a result of the intra-frame predictive coding, whether the inter-frame predictive coding needs to be performed.

When the probability of the intra-frame predictive coding is the second preset value, the first determining unit includes: a fourth determining subunit, configured to determine, when the probability of the inter-frame predictive coding is the first preset value, the coding scheme of the to-be-coded macroblock as the simultaneously performing the intra-frame predictive coding and the inter-frame predictive coding; a fifth determining subunit, configured to determine the coding scheme of the to-be-coded macroblock as the intra-frame predictive coding when the probability of the inter-frame predictive coding is the sixth preset value; and a sixth determining subunit, configured to determine, when the probability of the inter-frame predictive coding is the fifth preset value, the coding scheme of the to-be-coded macroblock as the first performing the intra-frame predictive coding and then determining, based on a result of the intra-frame predictive coding, whether the inter-frame predictive coding needs to be performed.

In this embodiment of the present application, the first determining module 61 includes: a second obtaining unit, configured to perform down-sampling of a preset ratio on the to-be-coded video frame, to obtain a pre-coded video frame; a segmentation unit, configured to segment the pre-coded video frame into a plurality of macroblocks; and a second determining unit, configured to determine the plurality of macroblocks as the to-be-coded macroblock one by one.

In this embodiment of the present application, the second obtaining unit includes: a third obtaining subunit, configured to perform the down-sampling of the preset ratio on the to-be-coded video frame, to obtain the pre-coded video frame; a segmentation subunit, configured to segment the pre-coded video frame into the plurality of macroblocks; and a seventh determining subunit, configured to determine the plurality of macroblocks as the to-be-coded macroblock one by one.

Figure 7:
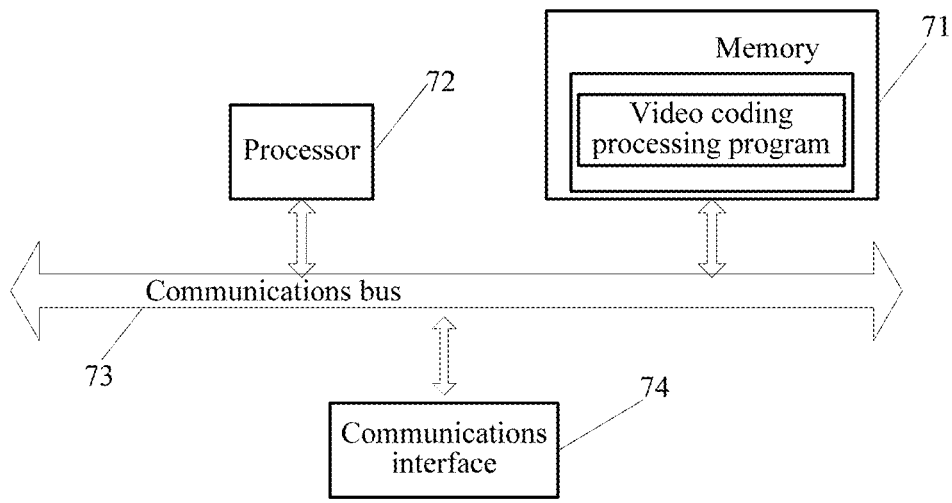
FIG. 7 is a structural diagram of an electronic device according to an embodiment of this application.

The video coding processing method and apparatus provided in the embodiments of this application may be applied to an electronic device (for example, a terminal or a server). FIG. 7 is a structural diagram of an electronic device according to an embodiment of this application. The electronic device may include: a memory 71, configured to store a program, where the program may include program code, and the program code includes computer-executable instructions, that is, machine-readable instructions, for example, a video coding processing program configured to perform the foregoing video coding processing method; and a processor 72, configured to execute the program.

The memory 71 may include a high-speed RAM memory, and may further include a non-volatile memory, for example, at least one magnetic disk memory.

The processor 72 may be a central processing unit (CPU) or an application-specific integrated circuit (ASIC), or may be one or more integrated circuits configured to implement the embodiments of this application.

The processor 72 executes the machine-readable instructions stored in the memory 71 to perform the following operations: identifying a to-be-coded macroblock in a to-be-coded video frame; obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame.

The operations may further include obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame; comparing the inter-frame coding cost with the intra-frame coding cost, to obtain a comparison result; determining a coding scheme of the to-be-coded macroblock based on the comparison result, the coding scheme including intra-frame predictive coding and inter-frame predictive coding; and coding the to-be-coded macroblock according to the coding scheme.

In this embodiment of the present application, the electronic device may further include a communications bus 73 and a communications interface 74. The memory 71, the processor 72, and the communications interface 74 communicate with each other based on the communications bus 73.

In this embodiment of the present application, the communication interface 74 may be an interface of a communication module, for example, an interface of a GSM module.

In this embodiment of the present application, for specific functions of the electronic device, refer to the foregoing video coding processing method and apparatus, and details are not described herein again.

In the several embodiments provided in the present application, it should be understood that the disclosed system, apparatus, and method may be implemented in other manners. For example, the described apparatus embodiments are merely exemplary. For example, a module, a sub-module, a unit, and a sub-unit may be merely logical function division and may be other division in actual implementation. For example, a plurality of modules or sub-modules or components may be combined or integrated into another system, or some features may be ignored or not performed.

The modules/units described as separate parts may or may not be physically separate, and the parts displayed as modules/units may or may not be physical modules/units, may be located in one position, or may be distributed on a plurality of modules or units. Some of or all of the modules or units may be selected according to actual needs to achieve the objectives of the solutions of the embodiments.

In addition, functional modules and units in the embodiments of the present disclosure may be integrated into one processing unit, or each of the units may exist alone physically, or two or more units may be integrated into one unit. The integrated units may be implemented in a form of hardware or may be implemented in a form of a software functional unit.

If implemented in the form of software functional modules and units and sold or used as an independent product, the integrated modules/units may be stored in a computer-readable storage medium. Based on such an understanding, the technical solutions of the present disclosure essentially, or the part contributing to the existing technology, or all or a part of the technical solutions may be implemented in a form of a software product. The computer software product is stored in a storage medium and includes several instructions for instructing one or more computer devices (which may be a personal computer, a server, a network device, or the like) to perform all or a part of steps of the methods described in the embodiments of the corresponding modules or units. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

At last, it should be noted that the relational terms herein such as first and second are used only to differentiate an entity or operation from another entity or operation, and do not require or imply any actual relationship or sequence between these entities or operations. In addition, the terms "include", "comprise", and any variants thereof are intended to cover a non-exclusive inclusion. Therefore, a process, method, object, or device that includes a series of elements not only includes such elements, but also includes other elements not specified expressly, or may include inherent elements of the process, method, object, or device. Unless otherwise specified, an element limited by "include a/an . . . " does not exclude other same elements existing in the process, the method, the article, or the device that includes the elements.

The embodiments in this specification are all described in a progressive manner. Descriptions of each embodiment focus on differences from other embodiments, and same or similar parts among respective embodiments may be mutually referenced.

The above descriptions of the disclosed embodiments make a person skilled in the art implement or use this application. Various modifications to these embodiments are obvious to a person skilled in the art, and the general principles defined in this specification may be implemented in other embodiments without departing from the spirit and scope of this application. Therefore, this application is not limited to these embodiments illustrated in this application, but needs to conform to the broadest scope consistent with the principles and novel features disclosed in this application.

What is claimed is:

1. A video coding processing method, applied to an electronic device, and comprising:

identifying a to-be-coded macroblock in a to-be-coded video frame;

obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the inter-frame coding scheme being error information obtained based on a coded video frame and the to-be-coded video frame;
obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the intra-frame coding scheme being error information obtained based on a coded macroblock in the to-be-coded video frame and the to-be-coded video frame;
comparing the inter-frame coding cost with the intra-frame coding cost to obtain a comparison result;
obtaining, based on the comparison result, a probability of performing intra-frame predictive coding on the to-be-coded macroblock and a probability of performing inter-frame predictive coding on the to-be-coded macroblock;
determining a coding scheme of the to-be-coded macroblock based on the probability of the intra-frame predictive coding and the probability of the inter-frame predictive coding, the coding scheme comprising the intra-frame predictive coding and the inter-frame predictive coding; and
coding the to-be-coded macroblock according to the coding scheme.

2. The video coding processing method according to claim 1, further comprising:
determining the coding scheme of the to-be-coded macroblock as the inter-frame predictive coding when the comparison result indicates that the intra-frame coding cost is greater than A multiplied by the inter-frame coding cost, wherein A is a coefficient greater than a first value; or
determining the coding scheme of the to-be-coded macroblock as the intra-frame predictive coding when the comparison result indicates that the inter-frame coding cost is greater than B multiplied by the intra-frame coding cost, wherein B is a coefficient greater than a second value.

3. The video coding processing method according to claim 1, wherein the obtaining, based on the comparison result, a probability of performing the intra-frame predictive coding on the to-be-coded macroblock and a probability of performing the inter-frame predictive coding on the to-be-coded macroblock comprises:
obtaining coding schemes of K neighboring coded macroblocks of the to-be-coded macroblock, wherein K is a positive integer; and
obtaining the probability of the intra-frame predictive coding and the probability of the inter-frame predictive coding based on the comparison result and the coding schemes of the K neighboring coded macroblocks.

4. The video coding processing method according to claim 3, wherein the obtaining the probability of the intra-frame predictive coding and the probability of the inter-frame predictive coding based on the comparison result and the coding schemes of the K neighboring coded macroblocks comprises:
setting the probability of the inter-frame predictive coding to a first value when the comparison result indicates that the intra-frame coding cost is greater than A multiplied by the inter-frame coding cost, and determining the probability of the intra-frame predictive coding based on a location of the to-be-coded macroblock in the to-be-coded video frame and the coding schemes of the K neighboring coded macroblocks, wherein A is a coefficient greater than a first value; or
setting the probability of the intra-frame predictive coding to a second value when the comparison result indicates that the inter-frame coding cost is greater than B multiplied by the intra-frame coding cost, and determining the probability of the inter-frame predictive coding based on a location of the to-be-coded macroblock in the to-be-coded video frame and the coding schemes of the K neighboring coded macroblocks, wherein B is a coefficient greater than a second value.

5. The video coding processing method according to claim 4, wherein the determining the probability of the intra-frame predictive coding based on a location of the to-be-coded macroblock in the to-be-coded video frame and the coding schemes of the K neighboring coded macroblocks comprises:
setting the probability of the intra-frame predictive coding to a third value when the to-be-coded macroblock is located at an edge of the to-be-coded video frame; or
setting the probability of the intra-frame predictive coding to a fourth value when the to-be-coded macroblock is not located at an edge of the to-be-coded video frame and a quantity of coded macroblocks using the intra-frame predictive coding in the K neighboring coded macroblocks is less than a third value.

6. The video coding processing method according to claim 5, wherein the determining the probability of the intra-frame predictive coding based on a location of the to-be-coded macroblock in the to-be-coded video frame and the coding schemes of the K neighboring coded macroblocks further comprises:
setting the probability of the intra-frame predictive coding to the second value when the to-be-coded macroblock is not located at the edge of the to-be-coded video frame and the quantity of coded macroblocks using the intra-frame predictive coding among the K neighboring coded macroblocks is greater than or equal to the third value.

7. The video coding processing method according to claim 6, wherein the coding scheme further comprises: simultaneously performing the intra-frame predictive coding and the inter-frame predictive coding; or first performing the inter-frame predictive coding and then determining, based on a result of the inter-frame predictive coding, whether the intra-frame predictive coding needs to be performed; and
when the probability of the inter-frame predictive coding is the first value, the determining the coding scheme of the to-be-coded macroblock based on the probability of the intra-frame predictive coding and the probability of the inter-frame predictive coding comprises:
determining, when the probability of the intra-frame predictive coding is the third value, the coding scheme of the to-be-coded macroblock as the first performing the inter-frame predictive coding and then determining, based on a result of the inter-frame predictive coding, whether the intra-frame predictive coding needs to be performed; or
determining the coding scheme of the to-be-coded macroblock as the inter-frame predictive coding when the probability of the intra-frame predictive coding is the fourth value; or
determining, when the probability of the intra-frame predictive coding is the second value, the coding scheme of the to-be-coded macroblock as the simultaneously performing the intra-frame predictive coding and the inter-frame predictive coding.

8. The video coding processing method according to claim 4, wherein the determining the probability of the inter-frame predictive coding based on a location of the to-be-coded macroblock in the to-be-coded video frame and the coding schemes of the K neighboring coded macroblocks comprises:
   setting the probability of the inter-frame predictive coding to a fifth value when the to-be-coded macroblock is located at an edge of the to-be-coded video frame; or
   setting the probability of the inter-frame predictive coding to a sixth value when the to-be-coded macroblock is not located at an edge of the to-be-coded video frame and a quantity of coded macroblocks using the intra-frame predictive coding in the K neighboring coded macroblocks is greater than or equal to a fourth value.

9. The video coding processing method according to claim 8, wherein the determining the probability of the inter-frame predictive coding based on a location of the to-be-coded macroblock in the to-be-coded video frame and the coding schemes of the K neighboring coded macroblocks further comprises:
   setting the probability of the inter-frame predictive coding to the first value when the to-be-coded macroblock is not located at the edge of the to-be-coded video frame and the quantity of coded macroblocks using the intra-frame predictive coding in the K neighboring coded macroblocks is less than the fourth value.

10. The video coding processing method according to claim 9, wherein the coding scheme further comprises: simultaneously performing the intra-frame predictive coding and the inter-frame predictive coding; or first performing the intra-frame predictive coding and then determining, based on a result of the intra-frame predictive coding, whether the inter-frame predictive coding needs to be performed; and
   when the probability of the intra-frame predictive coding is the second value, the determining the coding scheme of the to-be-coded macroblock based on the probability of the intra-frame predictive coding and the probability of the inter-frame predictive coding comprises:
   determining, when the probability of the inter-frame predictive coding is the fifth value, the coding scheme of the to-be-coded macroblock as the first performing the intra-frame predictive coding and then determining, based on a result of the intra-frame predictive coding, whether the inter-frame predictive coding needs to be performed; or
   determining the coding scheme of the to-be-coded macroblock as the intra-frame predictive coding when the probability of the inter-frame predictive coding is the sixth value; or
   determining, when the probability of the inter-frame predictive coding is the first value, the coding scheme of the to-be-coded macroblock as the simultaneously performing the intra-frame predictive coding and the inter-frame predictive coding.

11. The video coding processing method according to claim 1, wherein the identifying a to-be-coded macroblock in a to-be-coded video frame comprises:
   performing downsampling of a ratio on the to-be-coded video frame, to obtain a pre-coded video frame;
   segmenting the pre-coded video frame into a plurality of macroblocks; and
   determining the plurality of macroblocks as the to-be-coded macroblock one by one.

12. The video coding processing method according to claim 11, wherein the performing downsampling of a ratio on the to-be-coded video frame, to obtain a pre-coded video frame comprises:
   performing the downsampling of the ratio on the to-be-coded video frame, to obtain a target video frame; and
   adjusting the target video frame, to obtain the adjusted pre-coded video frame, so that a length of the pre-coded video frame is an integer multiple of a length of the to-be-coded macroblock, and a width of the pre-coded video frame is an integer multiple of a width of the to-be-coded macroblock.

13. A video coding processing apparatus, comprising:
   a processor and a memory connected to the processor, the memory storing machine-readable instructions executable to the processor, and the processor executing the machine-readable instructions to perform the following operations:
   identifying a to-be-coded macroblock in a to-be-coded video frame;
   obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame;
   obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame;
   comparing the inter-frame coding cost with the intra-frame coding cost, to obtain a comparison result;
   obtaining, based on the comparison result, a probability of performing intra-frame predictive coding on the to-be-coded macroblock and a probability of performing inter-frame predictive coding on the to-be-coded macroblock;
   determining a coding scheme of the to-be-coded macroblock based on the probability of the intra-frame predictive coding and the probability of the inter-frame predictive coding, the coding scheme comprising the intra-frame predictive coding and the inter-frame predictive coding; and
   coding the to-be-coded macroblock according to the coding scheme.

14. The video coding processing apparatus according to claim 13, wherein the processor further executes the machine-readable instructions to perform the following operations:
   determining the coding scheme of the to-be-coded macroblock as the inter-frame predictive coding when the comparison result indicates that the intra-frame coding cost is greater than A multiplied by the inter-frame coding cost, wherein A is a coefficient greater than a first value; or
   determining the coding scheme of the to-be-coded macroblock as the intra-frame predictive coding when the comparison result indicates that the inter-frame coding cost is greater than B multiplied by the intra-frame coding cost, wherein B is a coefficient greater than a second value.

15. The video coding processing apparatus according to claim 13, wherein the obtaining, based on the comparison result, a probability of performing the intra-frame predictive coding on the to-be-coded macroblock and a probability of performing the inter-frame predictive coding on the to-be-coded macroblock comprises:
obtaining coding schemes of K neighboring coded macroblocks of the to-be-coded macroblock, wherein K is a positive integer; and
obtaining the probability of the intra-frame predictive coding and the probability of the inter-frame predictive coding based on the comparison result and the coding schemes of the K neighboring coded macroblocks.

16. The video coding processing apparatus according to claim 15, wherein the obtaining the probability of the intra-frame predictive coding and the probability of the inter-frame predictive coding based on the comparison result and the coding schemes of the K neighboring coded macroblocks comprises:
setting the probability of the inter-frame predictive coding to a first value when the comparison result indicates that the intra-frame coding cost is greater than A multiplied by the inter-frame coding cost, and determining the probability of the intra-frame predictive coding based on a location of the to-be-coded macroblock in the to-be-coded video frame and the coding schemes of the K neighboring coded macroblocks, wherein A is a coefficient greater than a first value; or
setting the probability of the intra-frame predictive coding to a second value when the comparison result indicates that the inter-frame coding cost is greater than B multiplied by the intra-frame coding cost, and determining the probability of the inter-frame predictive coding based on a location of the to-be-coded macroblock in the to-be-coded video frame and the coding schemes of the K neighboring coded macroblocks, wherein B is a coefficient greater than a second value.

17. The video coding processing apparatus according to claim 16, wherein the determining the probability of the intra-frame predictive coding based on a location of the to-be-coded macroblock in the to-be-coded video frame and the coding schemes of the K neighboring coded macroblocks comprises:
setting the probability of the intra-frame predictive coding to a third value when the to-be-coded macroblock is located at an edge of the to-be-coded video frame; or
setting the probability of the intra-frame predictive coding to a fourth value when the to-be-coded macroblock is not located at an edge of the to-be-coded video frame and a quantity of coded macroblocks using the intra-frame predictive coding in the K neighboring coded macroblocks is less than a third value.

18. A non-transitory computer-readable storage medium, the storage medium storing machine-readable instructions, and the machine-readable instructions being capable of being executed by a processor to perform the following operations:
identifying a to-be-coded macroblock in a to-be-coded video frame;
obtaining an inter-frame coding cost of the to-be-coded macroblock based on at least one inter-frame coding scheme, a quantity of the at least one inter-frame coding scheme being less than a total quantity of inter-frame coding schemes, or a coding cost corresponding to the at least one inter-frame coding scheme being error information obtained based on a coded video frame and the to-be-coded video frame;
obtaining an intra-frame coding cost of the to-be-coded macroblock based on at least one intra-frame coding scheme, a quantity of the at least one intra-frame coding scheme being less than a total quantity of intra-frame coding schemes, or a coding cost corresponding to the at least one intra-frame coding scheme being error information obtained based on a coded macroblock in the to-be-coded video frame and the to-be-coded video frame;
comparing the inter-frame coding cost with the intra-frame coding cost, to obtain a comparison result;
obtaining, based on the comparison result, a probability of performing intra-frame predictive coding on the to-be-coded macroblock and a probability of performing inter-frame predictive coding on the to-be-coded macroblock;
determining a coding scheme of the to-be-coded macroblock based on the probability of the intra-frame predictive coding and the probability of the inter-frame predictive coding, the coding scheme comprising the intra-frame predictive coding and the inter-frame predictive coding; and
coding the to-be-coded macroblock according to the coding scheme.

* * * * *